Nov. 12, 1968      M. SHAMES      3,411,134

CONTROL DEVICE FOR VEHICLE BRAKE LIGHT

Filed Aug. 23, 1965

INVENTOR.
MAX SHAMES
BY
*Elliott & Pastoriza*
ATTORNEYS

United States Patent Office 3,411,134
Patented Nov. 12, 1968

3,411,134
CONTROL DEVICE FOR VEHICLE BRAKE LIGHT
Max Shames, 1213 Preston Way,
Venice, Calif. 90291
Continuation-in-part of application Ser. No. 426,965,
Jan. 21, 1965. This application Aug. 23, 1965, Ser.
No. 481,826
1 Claim. (Cl. 340—71)

ABSTRACT OF THE DISCLOSURE

A combination brake light and accelerator control device is provided as a single unit for automobiles. The unit is secured adjacent to the throttle valve mechanism and is interconnected with the brake light and electrical system of the car such that when a driver releases his foot from the accelerator pedal, the brake light will be immediately energized. The contact arrangement effecting this energization also simultaneously provides a proper control of closing of the throttle so that the engine will not die. A timer means is included to extinguish the brake light after releasing the accelerator pedal if the normal brakes are not applied within a given time interval.

---

This application is a continuation in part of my copending application Ser. No. 426,965, filed Jan. 21, 1965, and now abandoned, and entitled Combination Brake Light and Accelerator Control Device for Vehicles.

This invention relates to brake light controls for vehicles and more particularly to a novel combination brake light and accelerator control responsive to the removal of a driver's foot from the accelerator pedal in the vehicle to operate the brake light.

Conventional vehicle brake lights are operative whenever a driver brakes the vehicle. Normally, the driver in applying the vehicle brakes will first remove his foot from the accelerator pedal and shift it over to the brake pedal. As a consequence, there is a slight delay between the time that the accelerator pedal is released and the time that the brake is applied so that the brake light will not be energized until actual braking takes place.

It would be desirable to provide a brake light control which will energize the brake light whenever it is anticipated that the brakes might be used rather than at only those times when the brakes are actually applied. By such an arrangement, other vehicles following the one vehicle under consideration would be warned that the brakes of the forward vehicle may be applied before the brakes actually are applied, all to the end that greater safety would result in operating motor vehicles.

In addition, however, any such control device should not interfere with normal operation of the brake light by the brake pedal.

With the foregoing in mind, it is accordingly a primary object of this invention to provide an improved brake light control which is responsive to the removal of a driver's foot from the accelerator pedal regardless of whether or not the brake pedal is actually operated so that the brake light will be energized earlier than would be the case were it operated in response only to applying the brakes.

Another object is to provide an improved brake light control in combination with an accelerator control which will function to cushion the closing of the throttle valve of the vehicle in the same manner as is presently accomplished by "dash-pot" or retarding devices already provided in vehicles. By this arrangement, the brake light control may be installed as a substitute component for an already existing component so that little or no modification of the automobile structure is necessary.

Still another important object is to provide a means for operating the brake light of a vehicle in response to removal of the operator's foot from the accelerator and still permit the brake light to be operated by the brake pedal in a conventional manner after a given time period has elapsed.

Other objects and advantages of this invention are to provide an improved combination brake light and accelerator control device for vehicles which is relatively economical to manufacture, extremely simple to install, and which is reliable in operation.

Briefly, these and other objects and advantages of this invention are attained by providing a switch assembly including a plunger member adapted to be positioned for engagement by a part of the throttle mechanism. This part of the throttle mechanism corresponds to that part which normally engages a "dash-pot" device to delay complete closing of the throttle valve. Thus, it is only necessary to substitute the switch assembly for the conventional "dash-pot" or delay means normally provided in the automobile.

The switch assembly includes first and second contacts which are normally open but are responsive to inward movement of the plunger member to close. These contacts are connected between a source of electrical energy in the vehicle such as the vehicle battery or generator and the brake light so that closing of the contacts will energize the brake light. A timer is preferably included in the circuit to open the circuit to the brake light after a given period of time and permit the light to be controlled in the usual manner by the brake pedal.

With the foregoing arrangement, whenever the driver removes his foot from the accelerator pedal the throttle control linkage portion which normally engages the "dash-pot" delay in the automobile will now engage the switch assembly plunger to thereby energize the brake light for a given period of time. In addition, the plunger will gradually slow down the closing movement of the throttle valve so that it will serve the same function as the "dash-pot" delay device for which the switch assembly has been substituted.

A better understanding of the invention will be had by now referring to a preferred embodiment thereof as illustrated in the accompanying drawings, in which.

Figure 1:
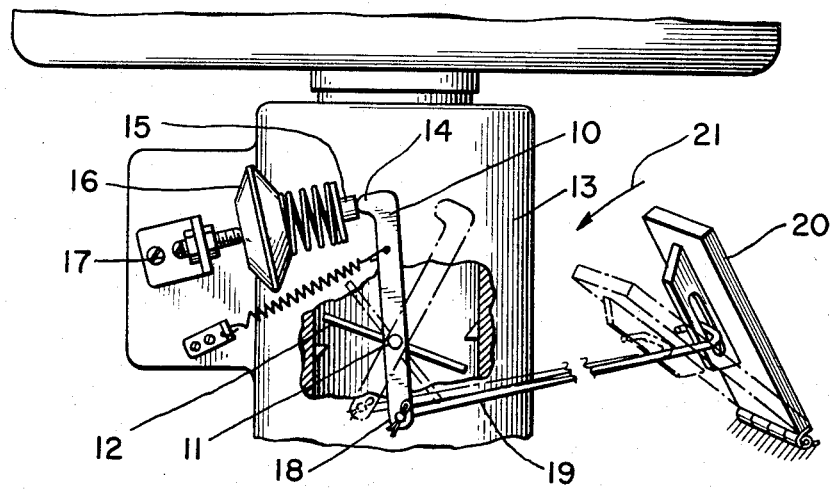
FIGURE 1 is a fragmentary schematic view, partly broken away, illustrating a conventional throttle linkage between an accelerator pedal and a throttle valve together with a conventional delay or "dash-pot" type device for delaying complete closing of the throttle.

Referring to FIGURE 1, there is shown a throttle lever arm 10 pivoted intermediate its ends at 11 to rotate a conventional butterfly type throttle valve 12. The throttle valve 12 is disposed in the neck of a carburetor 13.

Normally, the upper end of the lever 10 terminates in an end surface 14 arranged to engage a plunger 15 forming part of a retarding means or "dash-pot" device 16. The "dash-pot" device 16 is secured to the vehicle as by a bracket 17.

The lower end of the lever 10 is pivoted at 18 to a connecting rod 19, in turn, coupled to the accelerator pedal within the vehicle. The arrangement is such that depressing of the accelerator pedal 20 such as in the direction of the arrow 21 will move the various linkages to the dotted line positions illustrated so that the engaging end 14 will be free of the plunger 15 and the throttle valve 12 will be open for accelerating the vehicle.

When the accelerator pedal 20 is released as by removal of the driver's foot therefrom, the normal biasing spring connected to the lever arm 10 will move the lever end 14 back into engagement with the plunger 15 which will slow down or delay complete closing of the throttle 12 and thus prevent killing of the engine.

The foregoing structure is exemplary of conventional automobile accelerator control devices and is well known in the art.

Figure 2:
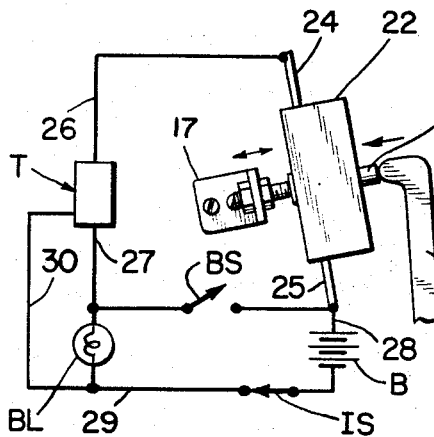
FIGURE 2 is a schematic illustration of the improved brake light and accelerator control device of this invention after substituting the same for the delay device illustrated in FIGURE 1 and showing the accelerator pedal linkage in a first position.

Referring now to FIGURE 2, there is illustrated at 22 a switch assembly forming the improved brake light and accelerator control of this invention. As shown, this switch assembly 22 is arranged to be substituted for the "dash-pot" 16 of FIGURE 1 by securing the same to the identical bracket 17. The switch assembly 22 includes a plunger 23 positioned to be engaged by the end of the lever arm 10 in the same manner that the plunger 15 was engaged by the end 14 of the lever 10 in FIGURE 1. The securing screw for the switch assembly may be adjusted within the bracket 17 as shown by the arrows to insure proper engagement of the plunger by the end 14.

As shown in FIGURE 2, the switch 22 includes first and second contact terminals 24 and 25. The first contact terminal 24 connects through a lead 26 to a timer T and thence through line 27 to the brake light BL. The second terminal 25 connects through a lead 28 to one side of the vehicle battery B. The other side of the vehicle battery B, in the example chosen for illustrative purposes, connects through the ignition switch IS and a line 29 to the other side of the brake light BL. A part of the timer circuit also connects to the line 29 as shown at 30. The circuit also includes the conventional brake light switch BS connected across the battery B and light BL as shown.

As will become clear as the description proceeds, terminals 24 and 25 are electrically connected together when the plunger 23 is urged inwardly into the switch assembly 22 by the upper end of the lever arm 10. Thus, the brake light BL will be energized when the components are in the position illustrated in FIGURE 2.

Figure 3:
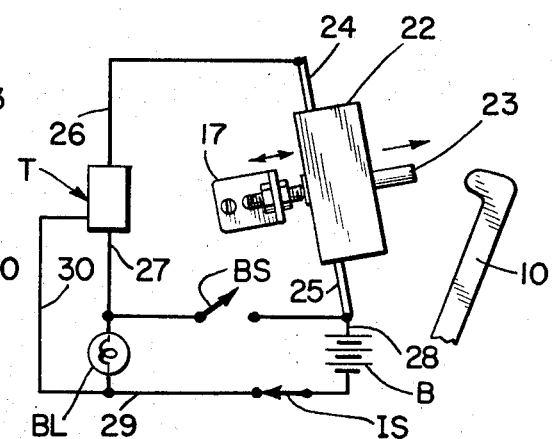
FIGURE 3 is a view similar to FIGURE 2 illustrating the accelerator pedal linkage in a second position.

Referring now to FIGURE 3, the elements are shown in their relative positions when the accelerator pedal 20 of FIGURE 1 is depressed which action removes the lever arm 10 from the plunger 23. In this condition, the plunger 23 moves outwardly from the switch assembly 22 and the terminal contacts are opened, thereby de-energizing the light BL.

Figure 4:
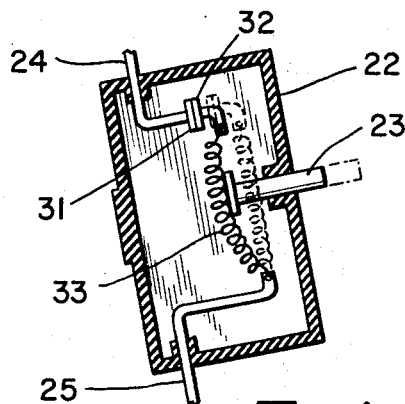
FIGURE 4 is a cross-section of the switch assembly itself showing details thereof; and, FIGURE 5 is a circuit diagram of one type of timer control.

FIGURE 4 illustrates one type of switch assembly 22 for effecting the foregoing energization and de-energization of the brake light. As shown, the first terminal 24 terminates in a first contact 31 which is stationary. A second contact 32, in turn, is cantilevered by a coil spring 33 connected to the second terminal 25. The cantilevering by the spring 33 is such as to bias the contact 32 against a portion of the switch assembly frame so as to be normally out of engagement with the first contact 31. The switch contacts are thus normally open.

As shown in FIGURE 4, the inner end of the plunger 23 engages the spring 33 in such a manner that inward movement of the plunger 23 will swing the second contact 32 into engagement with the first contact 31. Further inward movement of the plunger 23 after engagement of the contacts has been effected will be slowed because of the stretching of the spring 33 and thus the additional movement of the plunger 23 will be delayed as in a "dash-pot" type device.

When the engaging upper end of the throttle lever arm 10 described in FIGURES 1–3 moves away from the plunger 23, the spring 33 of FIGURE 4 will move the plunger 23 outwardly and permit the second contact 32 to leave the first contact 31 thereby disconnecting the terminals 24 and 25.

Figure 5:
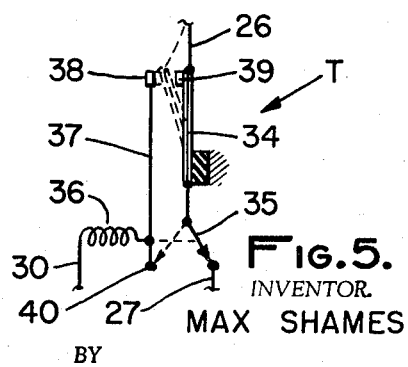

FIGURE 5 illustrates details of the timer T. As shown, the line 26 connects through a bimetallic strip 34 to a relay switch arm 35. A relay coil 36 for the arm 35, in turn, is connected between a contact line 37 and the line 30 from the timer. The contact line 37 includes a contact 38 arranged to be engaged by a contact 39 on the bimetallic strip 34 when it is heated. The line 37 also includes a contact 40 adapted to be engaged by the switch arm 35 when the relay coil 36 is energized. The switch arm 35 is normally connected to the line 27.

With the foregoing description in mind, the operation of the device will be evident. Initially, the conventional delay means or "dash-pot" device 16 in FIGURE 1 is removed from the bracket 17 and the switch assembly 22 of FIGURES 2, 3, and 4 substituted therefor. As described heretofore, the geometry of the switch assembly 22 and position of the assembly as adjusted by the bracket mounting screw is such that the plunger 23 will be engaged by the throttle arm 10 when the throttle is near its closed position. The vehicle brake light will thus be energized when the ignition switch 30 is first turned on. As the driver now operates the vehicle, when he depresses the accelerator pedal 20, the lever arm 10 will leave the plunger 23 so that the contacts in the switch assembly 22 will open and the brake light 29 will be extinguished.

As the driver operates the vehicle, if at any time he contemplates applying the brakes, his initial reaction will be to remove his foot from the accelerator pedal. At this precise moment, the releasing of the pedal will result in the lever arm 10 engaging the plunger 23 to close the contact 32 against the contact 31, as illustrated in solid lines in FIGURE 4, and thereby effect energization of the brake light. If the operator immediately reapplies pressure to the accelerator pedal to remove the lever arm 10 from the plunger 23, the brake light will be immediately extinguished. Normally, however, the driver will not remove his foot from the accelerator pedal unless he intends to apply the brakes so that by the arrangement, as described, a following vehicle will have ample warning of the driver's intention.

When the driver removes his foot completely from the accelerator pedal so that the brake light is energized, the biasing spring arrangement as described in FIGURE 4 will permit in a gradual manner further inward movement of the plunger 23 to take place which will delay complete closing of the throttle control as described in FIGURE 1. Thus, the switch assembly and contact arrangement serves the additional function of a "dash-pot" or delay means so that the throttle will not suddenly close and kill the engine.

In the event that the driver removes his foot from the accelerator pedal and does not reapply pressure to the pedal but intermittently operates the brake pedal, as might be the case in traveling on a long downgrade, it is desirable that the brake light turn on whenever the brake is applied; that is, it is desirable that the brake light switch operate in a normal manner. Such would not be the case unless the timer T were provided which serves to open the circuit from the switch 22 to the light after a given period so that the brake light will not be continuously operated by the switch 22 but will be under control of the brake light switch BS.

The manner in which the timer operates will be evident by referring to FIGURE 5. When the various elements are in the solid line position shown, it will be evident that a circuit is completed from the line 26 through the bimetallic strip 34 and switch arm 35 to the line 27 and thus to the brake light BL shown in FIGURE 2. The brake light BL will thus be energized for a given period of time during which period the bimetallic strip 34 heats up thereby warping the same to the dotted line position. When the bimetallic strip 34 attains the dotted line position which may be in a few seconds, the contact 38 will be engaged by the contact 39 thereby applying current from the line 26 through the relay coil 36 and down the line 30 to the other side of the battery B shown in FIGURE 2. The relay coil 36 is thus energized thereby throwing the switch arm 35 from the line 27 to the terminal 40. The current in the line 26 will then pass directly through the relay coil 36 thereby maintaining it energized and thus holding the switch arm 35 on the terminal 40. The circuit to the line 27 and the brake light BL, however, will be broken.

The brake light BL of FIGURE 2 may then be operated as described by the conventional brake switch BS. The switch 22 will have no further effect on the circuit until such time as the operator again reapplies pressure to the accelerator pedal 20. When the accelerator pedal 20 is depressed to accelerate the car, the switch contacts in the switch 22, shown at 31 and 32 in FIGURE 4, open as described thus removing current from the line 26 and de-energizing the relay coil 36 in the timer. When the relay coil 36 is deenergized, the switch arm 35 will move back to the line 27 and the entire circuit will be in condition to again effect immediate illumination of the brake light whenever the driver removes his foot from the accelerator pedal.

The present invention thus provides a novel means for controlling a vehicle brake light as well as the accelerator mechanism by performing the dual functions of energizing the light and cushioning the closing of the throttle valve. Since the switch assembly may be readily substituted for the conventional delay means or "dash-pot" in the throttle structure by employing the same supporting bracket 17 as described in FIGURE 1, no modification in the particular embodiment shown is necessary nor are special tools required to attach the device to the vehicle.

From the foregoing description, it will accordingly be clear that the present invention has provided an improved control device for vehicles which meets the various objects set forth.

What is claimed is:

1. A combination brake light and accelerator control device for a vehicle comprising: a switch assembly adapted to be secured adjacent to the throttle of said vehicle, said switch assembly including an actuating plunger positioned, when said assembly is secured to said throttle valve, to be engaged by a portion of said throttle valve; a first contact in said assembly for connection to a source of electrical energy in said vehicle; a second contact in said assembly for connection to the brake light of said vehicle so that closing of said first and second contacts energizes said brake light; and spring means in said assembly having a fixed end and a free end supporting second contact and cantilevering said second contact in a position normally out of engagement with said first contact, said spring means being engaged by said plunger intermediate its fixed end and said second contact upon movement of said plunger in response to removal of a driver's foot from the accelerator pedal, to close said second contact onto said first contact and thereafter cushion further movement of said plunger to control the closing of the throttle valve, whereby said brake light is energized whenever said driver's foot is removed from said accelerator pedal while driving said vehicle and whereby closing of said throttle valve is controlled to avoid sudden dying of said engine; and a timing means connected between said first contact and said brake light for opening the circuit between said first contact and said brake light after a predetermined period of time that said second contact is closed on said first contact, said timing means reconnecting said first contact to said brake light in response to separation of said second contact from said first contact.

References Cited

UNITED STATES PATENTS

| 2,275,695 | 3/1942 | Stafford | 340—66 |
| 2,520,681 | 8/1950 | Hanson | 340—66 XR |
| 2,552,665 | 5/1951 | Cirone | 340—262 XR |
| 2,568,610 | 9/1951 | Chappell | 340—262 XR |

JOHN W. CALDWELL, *Primary Examiner.*

A. H. WARING, *Assistant Examiner.*